(12) United States Patent
Tomatsu et al.

(10) Patent No.: US 11,631,880 B2
(45) Date of Patent: Apr. 18, 2023

(54) FUEL CELL STACK, FUEL CELL SYSTEM, AND METHOD FOR CONTROLLING FUEL CELL STACK

(71) Applicant: TOYOTA JIDOSHA KABUSHIKI KAISHA, Toyota (JP)

(72) Inventors: Jin Tomatsu, Nagoya (JP); Koro Fujio, Toyota (JP); Hikaru Tsutsui, Toyota (JP); Masaya Kobayashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 150 days.

(21) Appl. No.: 17/206,593

(22) Filed: Mar. 19, 2021

(65) Prior Publication Data
US 2021/0367260 A1    Nov. 25, 2021

(30) Foreign Application Priority Data
May 19, 2020    (JP) .............................. JP2020-087424

(51) Int. Cl.
*H01M 8/2483* (2016.01)
*H01M 8/0247* (2016.01)
(Continued)

(52) U.S. Cl.
CPC ....... *H01M 8/2483* (2016.02); *H01M 8/0247* (2013.01); *H01M 8/0438* (2013.01);
(Continued)

(58) Field of Classification Search
CPC .................................................. H01M 8/2483
See application file for complete search history.

(56) References Cited

U.S. PATENT DOCUMENTS

| 2010/0068570 A1* | 3/2010 | Otake ................. H01M 8/2483 |
| | | 429/415 |
| 2010/0209798 A1* | 8/2010 | Nunokawa .......... H01M 8/0276 |
| | | 429/455 |
| 2021/0359333 A1* | 11/2021 | Okabe ................. H01M 8/2483 |

FOREIGN PATENT DOCUMENTS

| JP | 2001-157759 | * | 6/2001 |
| JP | 2008-010347 A | | 1/2008 |

(Continued)

*Primary Examiner* — Jonathan Crepeau
(74) *Attorney, Agent, or Firm* — Dickinson Wright, PLLC

(57) ABSTRACT

The present disclosure provides a fuel cell stack, a fuel cell system and a method for controlling a fuel cell stack, which can reduce obstruction of reactive gas fluid channels caused by freezing of retained water, while allowing size to be reduced. The fuel cell stack of the disclosure comprises water storage units that are formed between every two adjacent fuel cell unit cells, surrounded by the adjacent separators, the wall members and the gaskets, and that communicate with the reactive gas discharge manifold via the gaps of the wall members. The fuel cell system of the disclosure controls either or both the valve and compressor in a reactive gas supply channel and/or the valve in a reactive gas discharge channel, to cause liquid water retained in the water storage units to be discharged out of the fuel cell stack. The controlling method of the disclosure includes reducing the pressure in and scavenging the interior of the reactive gas discharge manifold, to cause the liquid water that has been discharged into the reactive gas discharge manifold to be discharged out of the fuel cell stack.

7 Claims, 11 Drawing Sheets

(51) Int. Cl.
*H01M 8/0438* (2016.01)
*H01M 8/04492* (2016.01)
*H01M 8/04119* (2016.01)
*H01M 8/0271* (2016.01)

(52) U.S. Cl.
CPC ... *H01M 8/04179* (2013.01); *H01M 8/04492* (2013.01); *H01M 8/0271* (2013.01)

(56) References Cited

FOREIGN PATENT DOCUMENTS

| | | |
|---|---|---|
| JP | 2010-055857 A | 3/2010 |
| JP | 2016-021341 A | 2/2016 |
| JP | 2017117757 A | 6/2017 |
| JP | 2019192648 A | 10/2019 |

* cited by examiner

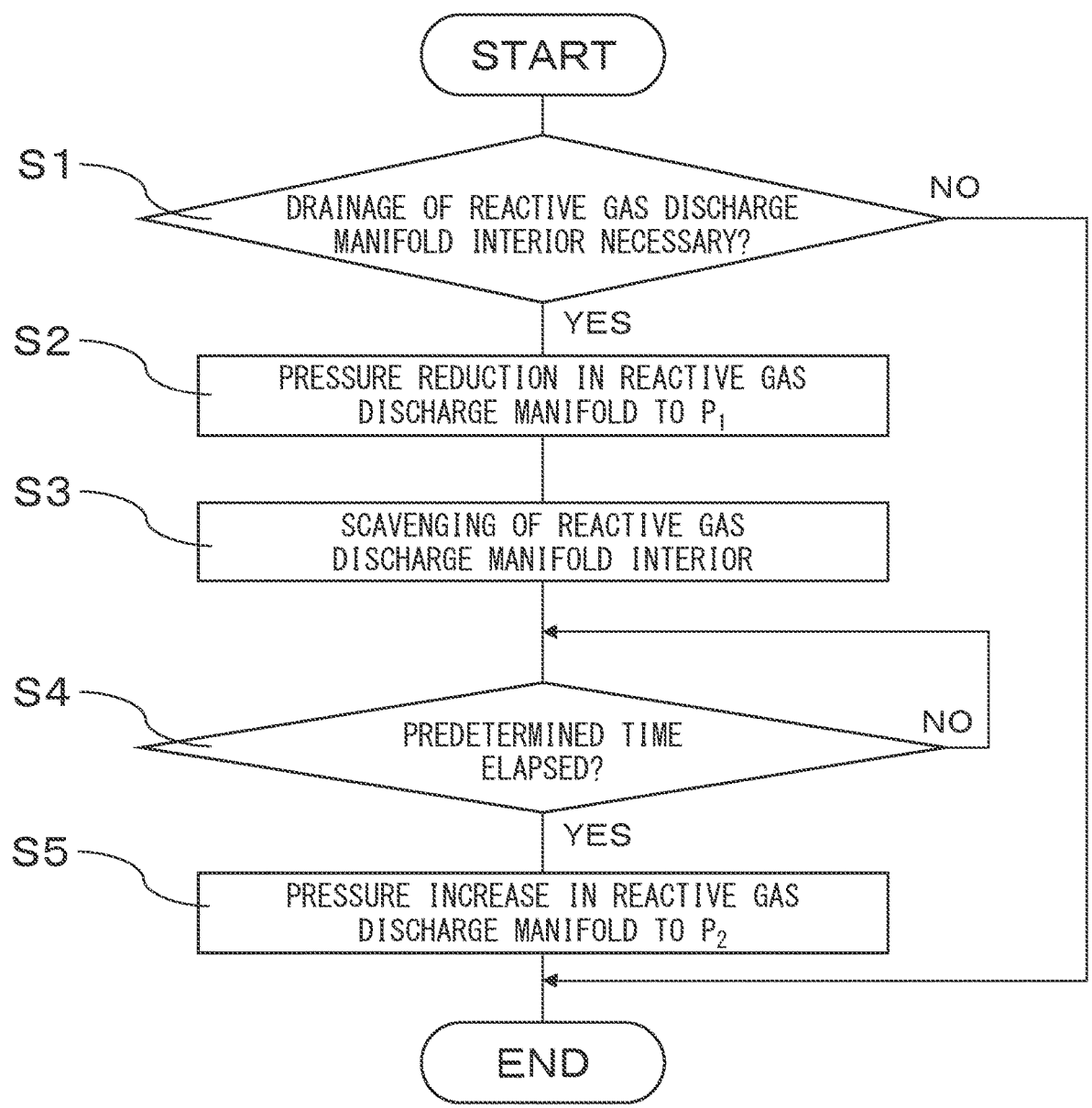

FUEL CELL STACK, FUEL CELL SYSTEM, AND METHOD FOR CONTROLLING FUEL CELL STACK

FIELD

The present disclosure relates to a fuel cell stack, to a fuel cell system and to a method for controlling a fuel cell stack.

BACKGROUND

Fuel cell unit cells are known that generate electricity by chemical reaction between an anode gas such as hydrogen and a cathode gas such as oxygen.

In a fuel cell system comprising a plurality of such fuel cell unit cells stacked together as a fuel cell stack, the water generated during electric power generation, or liquid water used for humidification of the reactive gases, i.e. the anode gas and/or cathode gas, sometimes pools in the reactive gas discharge manifold inside the fuel cell stack or in the fluid channels such as the pipes downstream from the fuel cell stack.

When the fuel cell system is exposed to a temperature below the freezing point while in this state, the retained water freezes in the fluid channels, obstructing the reactive gas fluid channels in the fuel cell system and potentially interfering with supply of reactive gas to the fuel cell unit cell.

The fuel cell system may therefore become difficult to operate at below the freezing point.

To counter this problem, PTL 1 discloses a fuel cell module having a construction in which a water storage unit is installed downstream from the fuel cell stack.

In addition, PTL 2 discloses a fuel cell module wherein, when the fuel cell is mounted in a vehicle, the reactive gas discharge manifold has a water storage unit in which liquid water pools, below the membrane electrode assembly. In the fuel cell module disclosed in that publication, the electrolyte membranes of a plurality of fuel cell unit cells are inserted in a manner extending to the water storage unit, with one of the pair of end plates having a draining fluid channel that can discharge liquid water retained in the water storage unit to the exterior of the fuel cell module.

CITATION LIST

Patent Literature

[PTL 1] Japanese Unexamined Patent Publication No. 2019-192648
[PTL 2] Japanese Unexamined Patent Publication No. 2017-117757

SUMMARY

Technical Problem

While one solution is to install a water storage unit in the fuel cell module from the viewpoint of inhibiting obstruction of reactive gas fluid channels in a fuel cell system, as in PTLs 1 and 2, installation of a water storage unit increases the size of the fuel cell system as a whole, including the fuel cell module.

However, when implementing a fuel cell system in a vehicle or the like which has limited mounting space, it is preferable to reduce the size of the fuel cell system as a whole.

It is an object of the present disclosure to provide a fuel cell stack, a fuel cell system and a method for controlling a fuel cell stack, which can reduce obstruction of reactive gas fluid channels caused by freezing of retained water, while allowing size to be reduced.

Solution to Problem

The present inventors have found that the aforementioned object can be achieved by the following means:

<Aspect 1>
A fuel cell stack comprising two or more fuel cell unit cells stacked together, in which:
each fuel cell unit cell has a power generating element and a pair of separators stacked on either side of the power generating element,
the pair of separators have reactive gas discharge flow holes running through the pair of separators in the stacking direction of the fuel cell unit cells, and
every two adjacent fuel cell unit cells are stacked together with their separators mutually adjacent and with the reactive gas discharge flow holes of the separators connected to form a reactive gas discharge manifold,
wherein:
the fuel cell stack has wall members and gaskets between the separators of the two mutually adjacent fuel cell unit cells,
the wall members are disposed so as to have gaps in at least portions of the regions between the separators of the two mutually adjacent fuel cell unit cells and so as to enclose the reactive gas discharge flow holes as viewed in the stacking direction, and
the gaskets join together the separators of the two mutually adjacent fuel cell unit cells and are disposed so as to at least partially have gaps with the wall members on the opposite sides of the wall members from the reactive gas discharge flow holes, as viewed in the stacking direction,
whereby water storage units are formed that are surrounded by the separators of the two mutually adjacent fuel cell unit cells, the wall members and the gaskets, and that communicate with the reactive gas discharge manifold via the gaps of the wall members.

<Aspect 2>
The fuel cell stack according to aspect 1, wherein each wall member is formed by at least one of the separators of the two mutually adjacent fuel cell unit cells.

<Aspect 3>
The fuel cell stack according to aspect 1 or 2, wherein the reactive gas discharge manifold is a cathode gas discharge manifold or an anode gas discharge manifold.

<Aspect 4>
The fuel cell stack according to any one of aspects 1 to 3, wherein the power generating element has a cathode gas diffusion layer, a cathode catalyst electrode layer, an electrolyte layer, an anode catalyst electrode layer and an anode gas diffusion layer in that order.

<Aspect 5>
A fuel cell system comprising a fuel cell stack according to any one of aspects 1 to 4, a reactive gas supply channel, a reactive gas discharge channel and a controller, wherein:
reactive gas is circulated through the reactive gas supply channel, the fuel cell stack and the reactive gas discharge channel in that order,
the reactive gas supply channel has a valve and/or a compressor,
the reactive gas discharge channel has a valve, and
the controller:
controls at least one from among the valve and compressor of the reactive gas supply channel and the valve of the reactive gas discharge channel, to reduce the pressure in the reactive gas discharge manifold, thereby discharging liquid water formed by the cell reaction, which has been retained in the water storage unit, into the reactive gas discharge manifold, and to scavenge the interior of the reactive gas discharge manifold, allowing the liquid water that has been discharged into the reactive gas discharge manifold to be discharged out of the fuel cell stack.

<Aspect 6>

The fuel cell system according to aspect 5, wherein:

at least one from among the valve and compressor of the reactive gas supply channel and the valve of the reactive gas discharge channel is controlled to increase the pressure in the reactive gas discharge manifold, allowing liquid water that was not discharged out of the fuel cell stack to flow into and be retained in the water storage unit.

<Aspect 7>

A method for controlling a fuel cell stack according to any one of aspects 1 to 4, wherein the method includes:

reducing the pressure in the reactive gas discharge manifold to discharge liquid water produced by electric power generation in the fuel cell stack, which has been retained in the water storage unit, into the reactive gas discharge manifold, and scavenging the interior of the reactive gas discharge manifold, so that liquid water that was discharged into the reactive gas discharge manifold is discharged out of the fuel cell stack.

<Aspect 8>

The method according to aspect 7, which further includes increasing the pressure in the reactive gas discharge manifold to cause liquid water that was not discharged out of the fuel cell stack by the scavenging, to flow into and be retained in the water storage unit.

Advantageous Effects of Invention

According to the present disclosure it is possible to provide a fuel cell stack, a fuel cell system and a method for controlling a fuel cell stack, which can reduce obstruction of reactive gas fluid channels caused by freezing of retained water, while allowing size to be reduced.

BRIEF DESCRIPTION OF DRAWINGS

FIG. 11 is a flow chart illustrating a method of controlling the fuel cell stack 10 according to the first embodiment of the disclosure.

DESCRIPTION OF EMBODIMENTS

Embodiments of the disclosure will now be described in detail. The disclosure is not limited to the embodiments described below, however, and various modifications may be implemented which do not depart from the gist thereof <Fuel Cell Stack>

The fuel cell stack of the disclosure has two or more fuel cell unit cells stacked together, the fuel cell unit cells each comprising a power generating element and a pair of separators stacked on either side of the power generating element, the pair of separators having reactive gas discharge flow holes running through the pair of separators in the stacking direction of the fuel cell unit cell, and every two adjacent fuel cell unit cells being stacked together with their separators adjacent and having the reactive gas discharge flow holes of the separators connected together to form a reactive gas discharge manifold.

The fuel cell stack of the disclosure has wall members and gaskets between the separators of every two adjacent fuel cell unit cells. The wall members are disposed so as to have gaps in at least portions of the regions between the separators of every two adjacent fuel cell unit cells, and so as to enclose the reactive gas discharge flow holes, as viewed in the stacking direction. The gaskets join together the separators of every two adjacent fuel cell unit cells, and are disposed so as to at least partially have gaps with the wall members, on opposite sides of the wall members from the reactive gas discharge flow holes, as viewed in the stacking direction. In the fuel cell stack of the disclosure, therefore, water storage units are formed that are surrounded by the separators of every two adjacent fuel cell unit cells, the wall members and the gaskets, and that communicate with the reactive gas discharge manifold via the gaps of the wall members.

A more specific construction for the fuel cell stack of the disclosure will now be described using FIGS. 1 to 4.

FIGS. 1 to 4 are full or partial schematic views of the fuel cell stack 100 according to the first embodiment of the disclosure.

Figure 1:
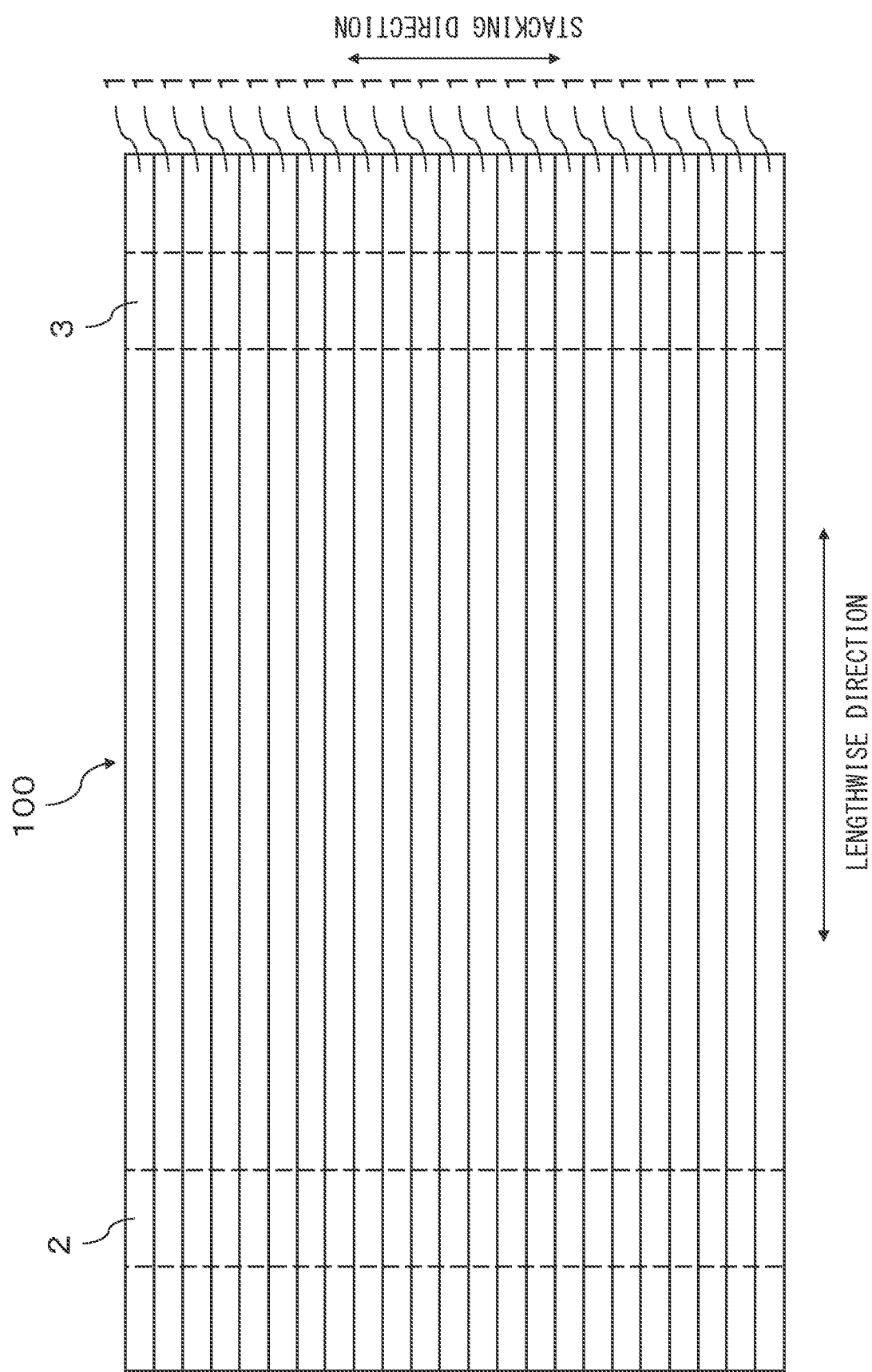
FIG. 1 is a schematic diagram showing a fuel cell stack 100 according to a first embodiment of the disclosure as seen from the side.

As shown in FIG. 1, the fuel cell stack 100 of the first embodiment of the disclosure has a construction in which a plurality of fuel cell unit cells 1 are stacked together.

Figure 2:
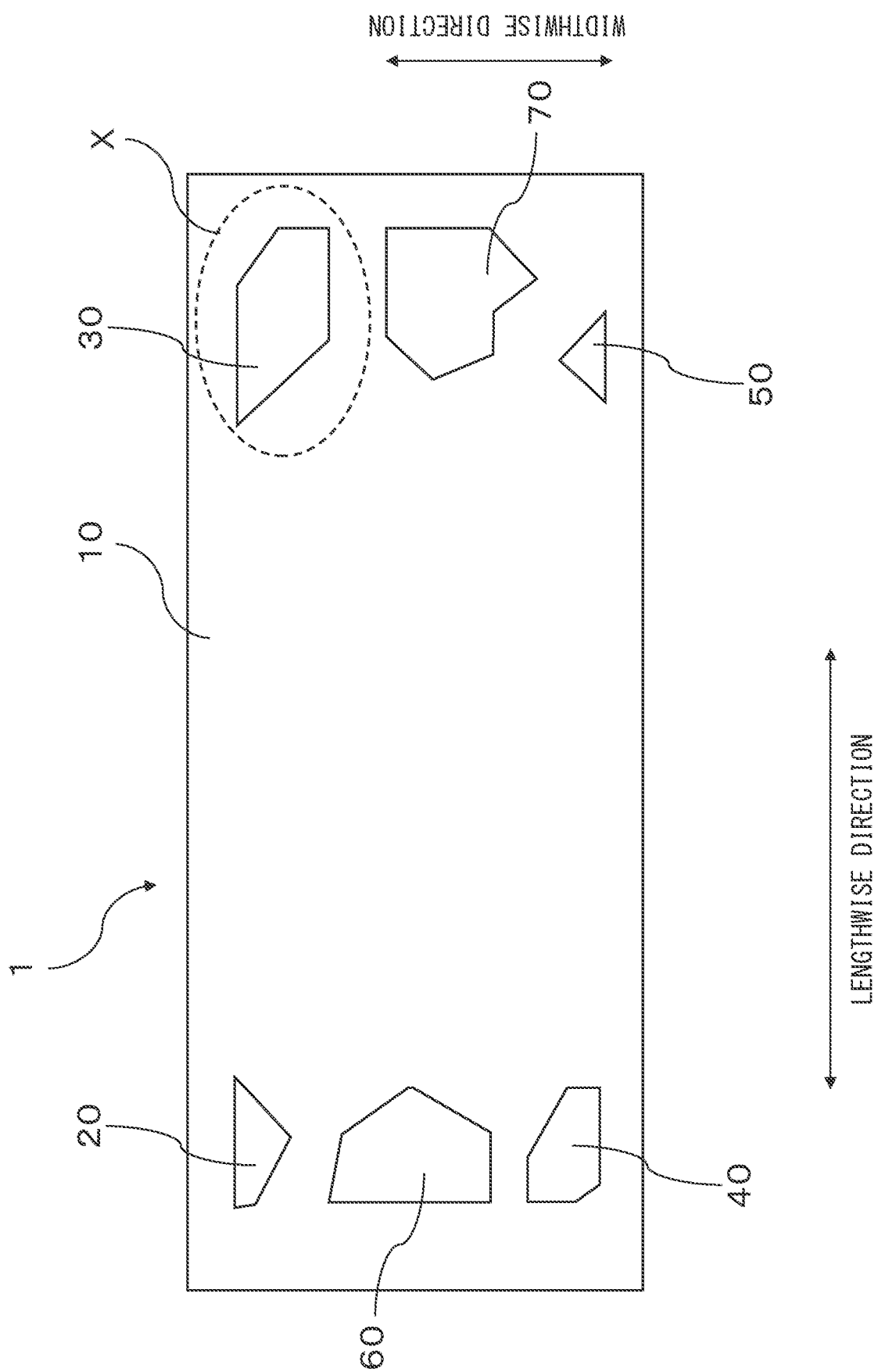
FIG. 2 is a schematic view of a fuel cell unit cell 1 of the fuel cell stack 100 according to the first embodiment of the disclosure, as seen from the stacking direction.

While not shown in the drawing, each fuel cell unit cell 1 has a power generating element, and a pair of separators 10 stacked on either side of the power generating element. As shown in FIG. 2, the pair of separators 10 each have reactive gas supply flow holes 20, 40, reactive gas discharge flow holes 30, 50 and coolant flow channels 60, 70, running through the pair of separators 10 in the stacking direction of the fuel cell unit cell 1.

Every two adjacent fuel cell unit cells 1 also have their separators 10 adjacent to each other, the reactive gas supply flow holes 20, 40, reactive gas discharge flow holes 30, 50 and coolant flow channels 60, 70 of the adjacent separators 10 being mutually connected to form a reactive gas supply manifold 2, a reactive gas discharge manifold 3 and a coolant flow manifold (not shown).

In the fuel cell stack 100 of the first embodiment of the disclosure, each fuel cell unit cell 1 has a wall member 31 and a gasket 33 between the separators 10 of the two adjacent fuel cell unit cells 1.

Figure 3:
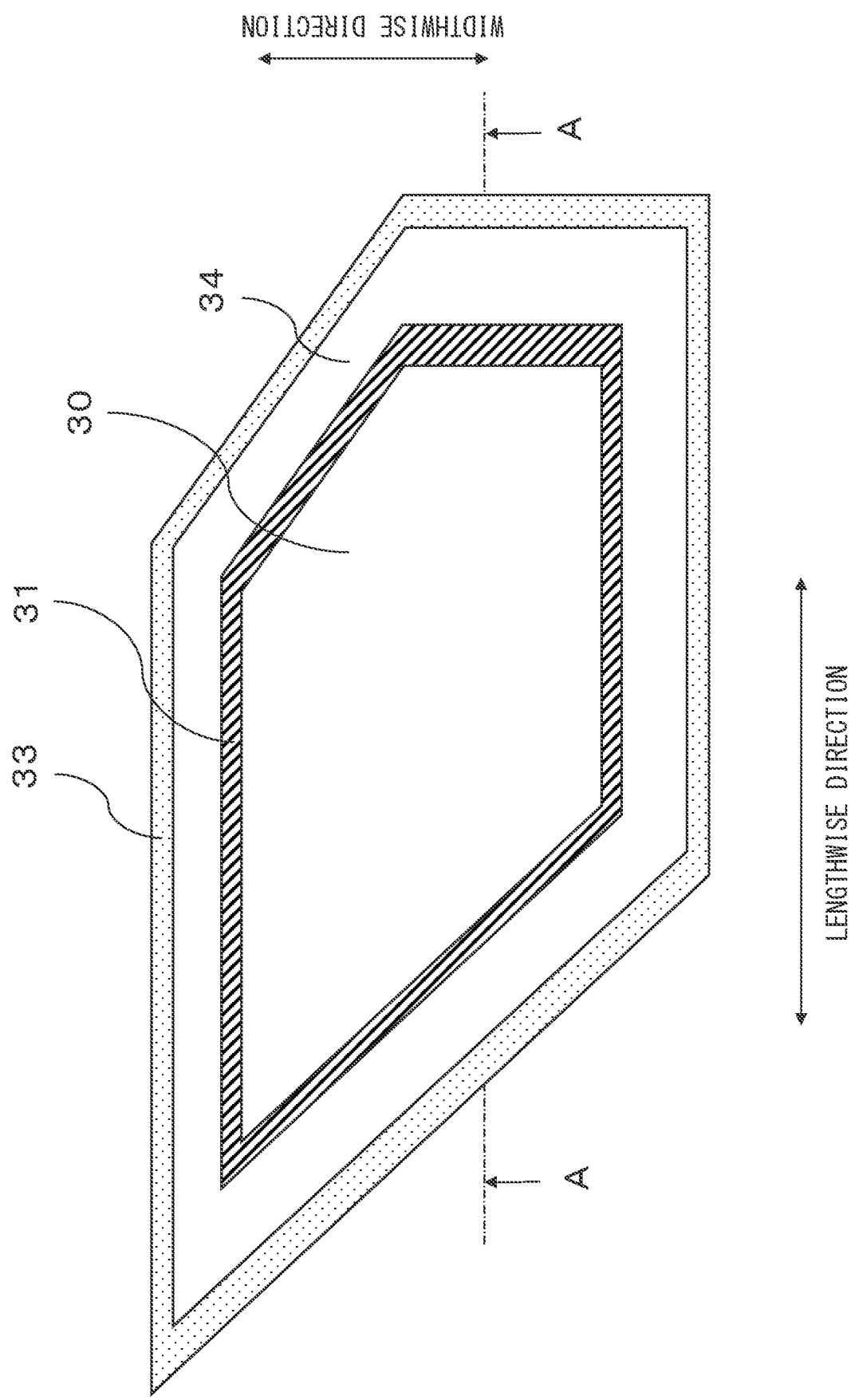
FIG. 3 is a magnified view of the X portion of FIG. 2.
Figure 4:
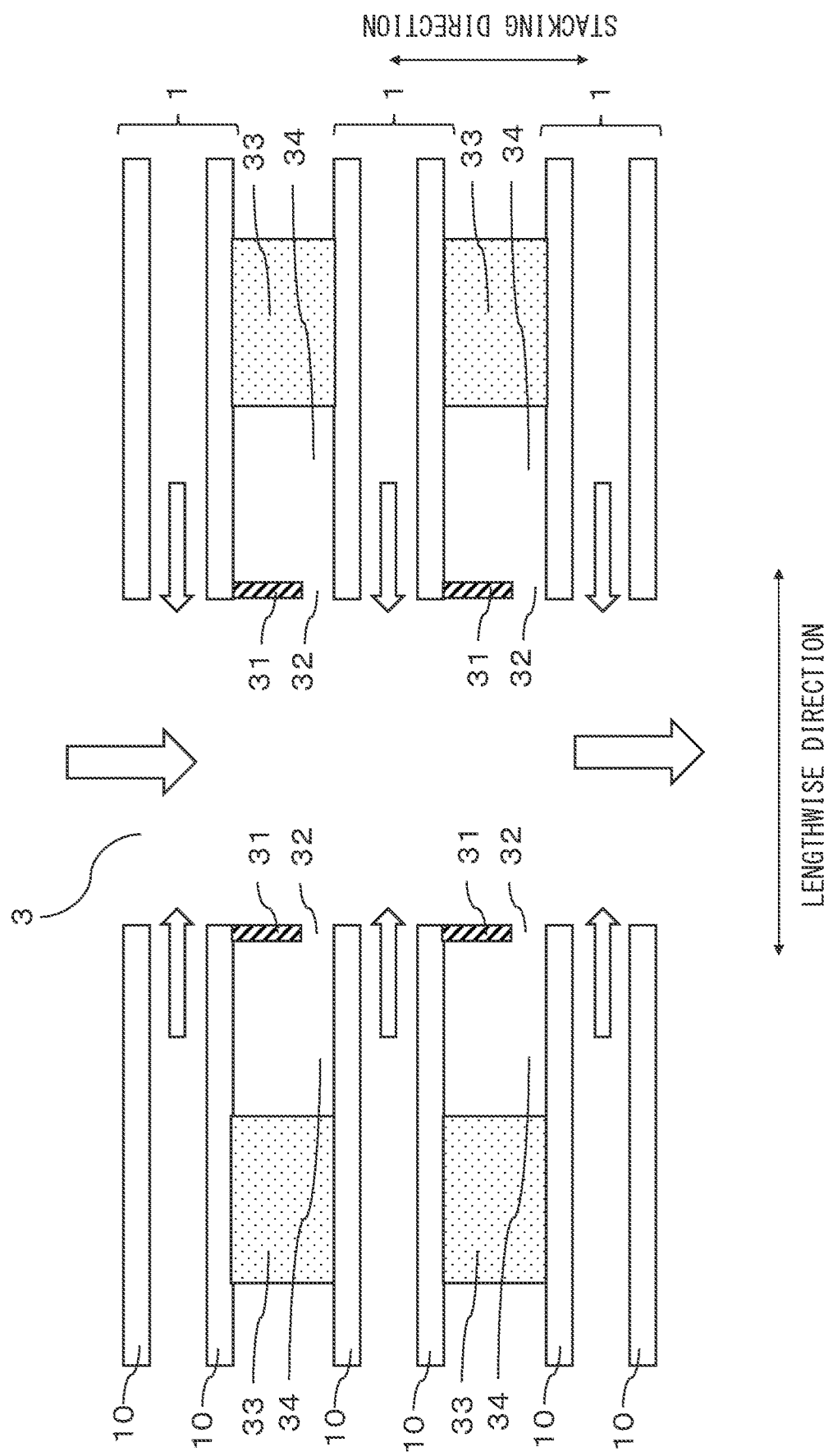
FIG. 4 is a cross-sectional view of the fuel cell stack 100 according to the first embodiment of the disclosure, along cross-section A-A' in FIG. 3.

As shown in FIG. 3, the wall member 31 is disposed so as to enclose the reactive gas discharge flow hole 30, as viewed in the stacking direction. In addition, as shown in FIG. 4, the wall member 31 is also disposed so as to form a gap 32 at least partially between the separators 10 of the two adjacent fuel cell unit cells 1. In FIG. 4, each wall member 31 is joined to one of the separators 10 of the two adjacent fuel cell unit cells 1, forming a gap 32 between the wall member 31 and the other separator 10.

As shown in FIG. 3, the gasket 33 is also disposed so as to have a gap with the wall member 31 on the opposite side of the wall member 31 from the reactive gas discharge flow hole 30, as viewed from the stacking direction. As shown in FIG. 4, it is also disposed so as to join the separators 10 of the two adjacent fuel cell unit cells 1.

Since the wall members 31 and gaskets 33 have such a construction, water storage units 34 are formed that are surrounded by the separators 10 of every two adjacent fuel cell unit cells 1, wall members 31 and gaskets 33, and that communicate with the reactive gas discharge manifold 3 via the gaps 32 between the wall members 31.

In FIG. 4, the outlined arrows indicate the direction in which the reactive gas flows during electric power generation. FIGS. 1 to 4 are not intended to limit the fuel cell stack, fuel cell system or controlling method of the disclosure.

Figure 5:
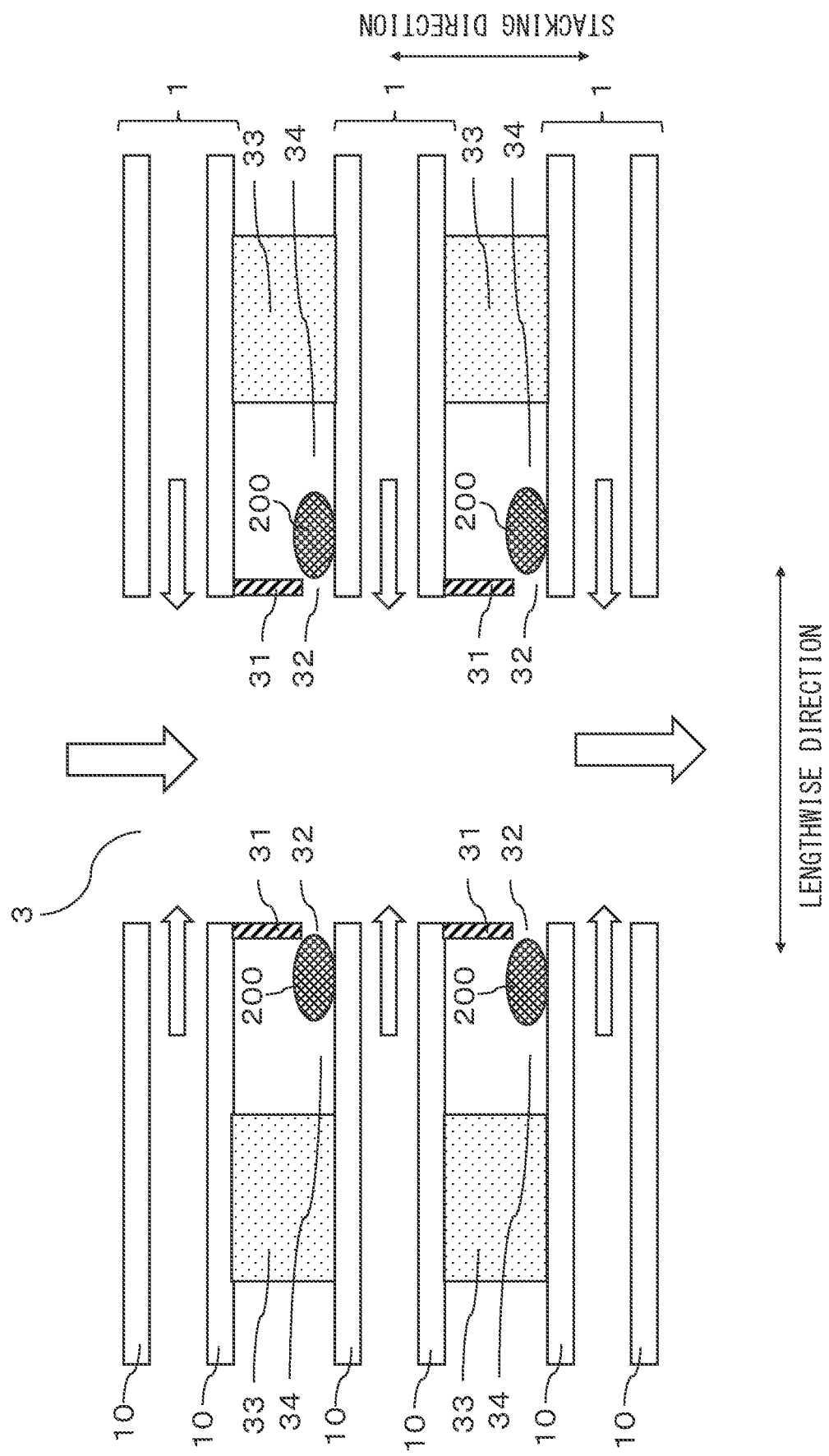
FIG. 5 is a cross-sectional view of the state of using the fuel cell stack 100 according to the first embodiment of the disclosure, along cross-section A-A' in FIG. 3.

In the fuel cell stack of the first embodiment of the disclosure, as shown in FIG. 5, liquid water produced during electric power generation in the fuel cell stack, as well as liquid water used for humidification of the reactive gases, i.e. the anode gas and/or cathode gas, flows into the reactive gas discharge manifold together with the reactive gas, with a portion thereof being discharged out of the fuel cell stack, while the remaining liquid water 200 flows through the gaps 32 through which the water storage units 34 and reactive gas discharge manifold 3 communicate, and into the water storage unit 34. It is thus possible to reduce liquid water retained in the reactive gas discharge manifold 3.

This can inhibit obstruction of the reactive gas discharge manifold 3 by freezing of liquid water 200 that has been retained in the reactive gas discharge manifold during operation at below the freezing point, for example.

Figure 6:
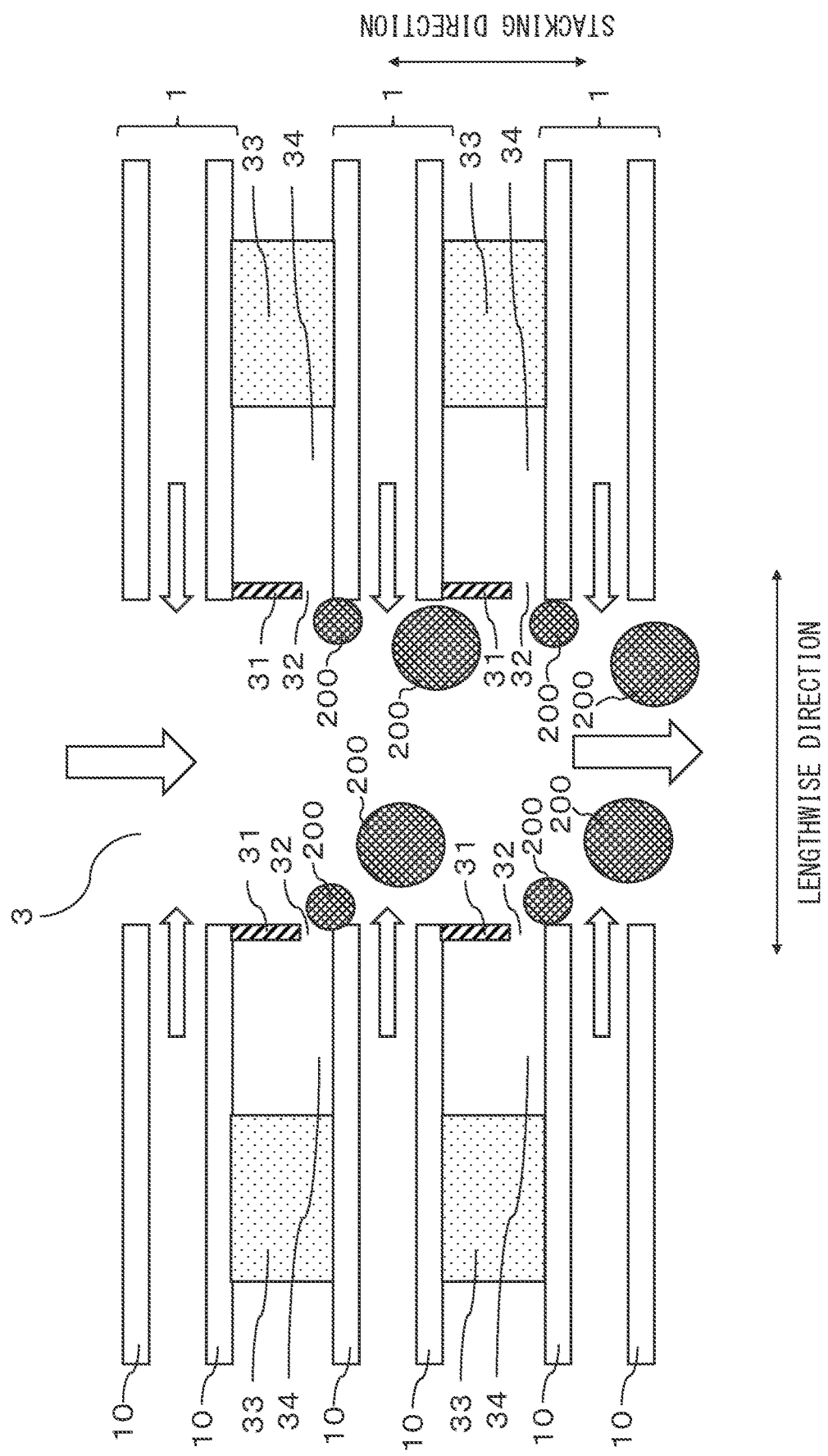
FIG. 6 is a cross-sectional view of the state of using the fuel cell stack 100 according to the first embodiment of the disclosure, along cross-section A-A' in FIG. 3.
Figure 7:
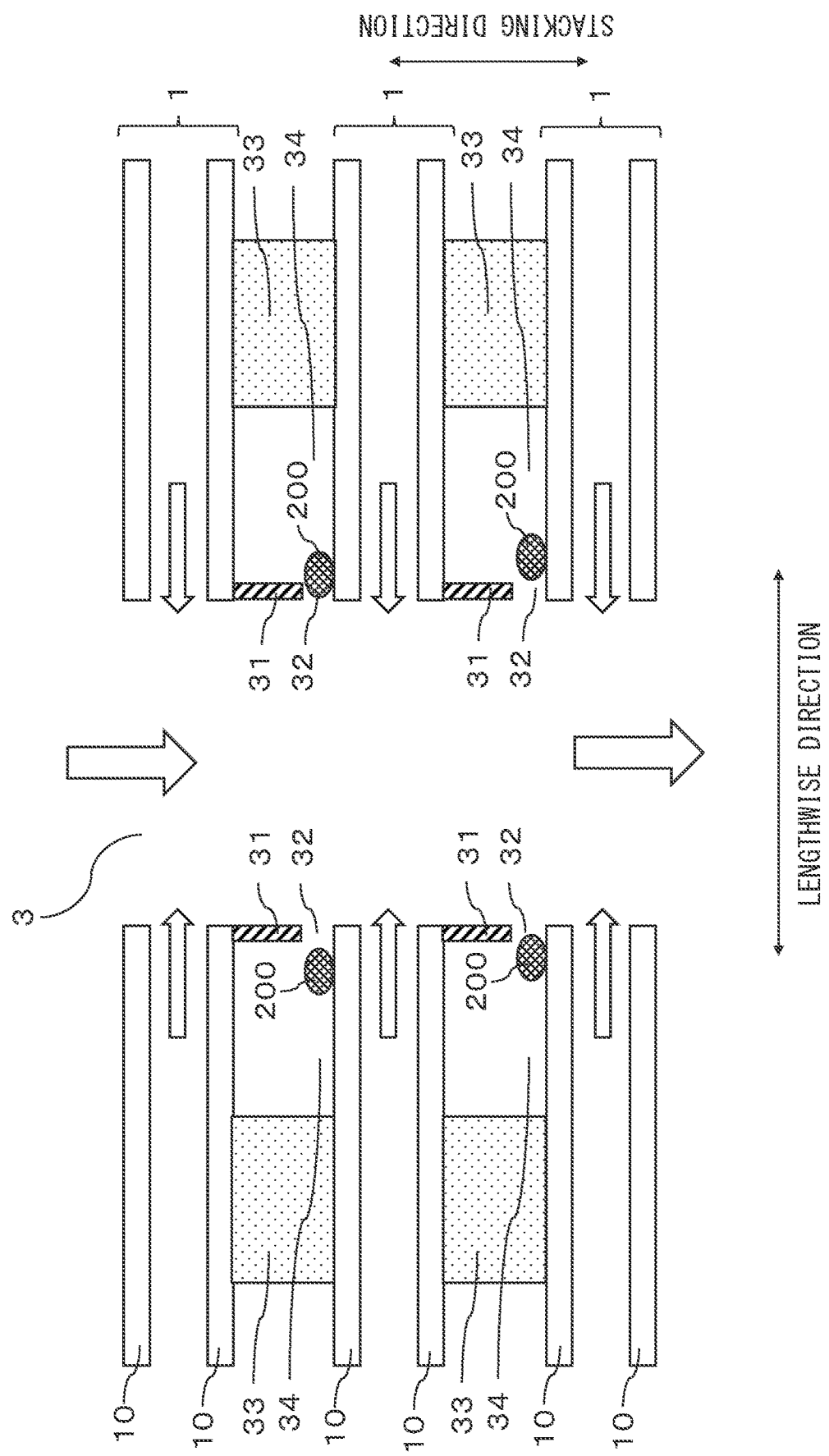
FIG. 7 is a cross-sectional view of the state of using the fuel cell stack 100 according to the first embodiment of the disclosure, along cross-section A-A' in FIG. 3.

When the external air temperature falls and it is expected that the temperature in the fuel cell stack 100 and/or in the reactive gas discharge channel downstream from it will be below the freezing point during operation, it may be necessary to discharge the liquid water 200 from the water storage unit 34 beforehand to cause retention of liquid water 200 in the water storage unit 34 during operation. In such cases, the pressure inside the reactive gas discharge manifold 3 may be reduced to cause drainage from the water storage unit 34 into the reactive gas discharge manifold 3, and further scavenging of the interior of the reactive gas discharge manifold 3 in a selective manner allows the difference in air pressure between the water storage unit 34 interior and the reactive gas discharge manifold 3 interior to be utilized for discharge out of the fuel cell stack, as shown in FIG. 6. As shown in FIG. 7, the pressure in the reactive gas discharge manifold 3 can be increased, utilizing the difference in air pressure between the water storage unit 34 interior and reactive gas discharge manifold 3 interior, allowing the liquid water that could not be discharged out of the fuel cell stack to be redrawn into the water storage unit 34 and retained.

In FIGS. 5 to 7, the outlined arrows indicate the direction in which the reactive gas flows during electric power generation. FIGS. 5 to 7 are not intended to limit the fuel cell stack, fuel cell system or controlling method of the disclosure.

Since the fuel cell stack of the disclosure has gaskets disposed between adjacent fuel cell unit cells when the fuel cell unit cells are stacked together, a constant thickness is maintained between the fuel cell unit cells. Spaces are provided at the thick portions in the fuel cell stack of the disclosure, as water storage units. Therefore, the fuel cell stack of the disclosure does not need to provide a water storage unit downstream from the fuel cell stack or to expand the fuel cell unit cells in the in-plane direction to form water storage units, which increases the size of the fuel cell system as a whole including the fuel cell module, as in a conventional fuel cell system.

The fuel cell stack of the disclosure can therefore reduce obstruction of the reactive gas fluid channels and can be reduced in size.

Moreover, since the fuel cell stack of the disclosure can control drainage and retention of liquid water in the water storage units by reducing or increasing pressure inside the reactive gas discharge manifold, it facilitates control of the amount of water retained in the water storage units.

<Fuel Cell Unit Cells>

Each of the fuel cell unit cells in the fuel cell stack of the disclosure has a power generating element, and a pair of separators stacked on either side of the power generating element.

The direction of stacking of the power generating elements and the pair of separators stacked on either side of the power generating elements, i.e. the stacking direction of the fuel cell unit cell, may be the same as the direction in which each of the fuel cell unit cells are stacked in the fuel cell stack, i.e. the stacking direction of the fuel cell stack.

(Power Generating Element)

The power generating element is an element that can generate electricity by cell reaction in the fuel cell, and specifically electrochemical reaction between the anode gas (hydrogen) and the cathode gas (oxygen or air).

The power generating element may have a cathode gas diffusion layer, a cathode catalyst electrode layer, an electrolyte layer, an anode catalyst electrode layer and an anode gas diffusion layer in that order.

The materials and forms of the cathode gas diffusion layer, cathode catalyst electrode layer, electrolyte layer, anode catalyst electrode layer and anode gas diffusion layer may be those commonly employed for conventional fuel cells.

(Separators)

The pair of separators have reactive gas discharge flow holes running through them in the stacking direction of the fuel cell unit cell. The reactive gas discharge flow holes may be anode gas discharge flow holes or cathode gas discharge flow holes.

The pair of separators may also have reactive gas supply flow holes and coolant flow holes.

The material used for the pair of separators may be those commonly employed for fuel cells. The forms of the pair of separators may also be forms commonly employed for conventional fuel cells, so long as they can form water storage units together with the wall members and gaskets.

<Reactive Gas Discharge Manifold>

The reactive gas discharge manifold is formed by the reactive gas discharge flow holes of the separator of two adjacent fuel cell unit cells being connected together.

The reactive gas discharge manifold may extend in the stacking direction of the fuel cell stack.

The reactive gas discharge manifold may be a cathode gas discharge manifold or an anode gas discharge manifold, or both.

<Wall Members>

Between the separators of every two adjacent fuel cell unit cells, the wall members are disposed so as to have gaps in at least portions of the regions between the separators of the two adjacent fuel cell unit cells, and so as to enclose the reactive gas discharge flow holes, as viewed in the stacking direction.

The wall members may have any form that allows communication between the water storage units and the reactive gas discharge manifold through the gaps while also partitioning them.

For example, each wall member may be joined with one of the separators and not joined with the other separator, so as to have a gap with the other separator. Each of the wall members may also be joined with both separators, forming a gap that allows communication between the water storage unit and the reactive gas discharge manifold.

The gap may be of a size with an area of greater than 0% and no more than 50% of the surface area of the wall member, compared to the surface area when the wall member does not have a gap between the separators of two adjacent fuel cell unit cells. The gap may have a size such that the area is greater than 0%, 5% or greater, 10% or greater or 20% or greater, and no more than 50%, no more than 40% or no more than 30%, compared to the surface area of the wall member.

The material of the wall members may be a metal, carbon material or plastic material, or it may be the same material as the separators.

The wall members are preferably formed by at least one of the facing separators of every two adjacent fuel cell unit cells. If the wall members are formed by at least one of the separators, the number of parts in the fuel cell stack will be reduced, thus making it easier to assemble the fuel cell stack. Such a construction can also reduce dislocation between the wall members and the reactive gas discharge flow holes when the fuel cell unit cells are stacked together.

Figure 8:
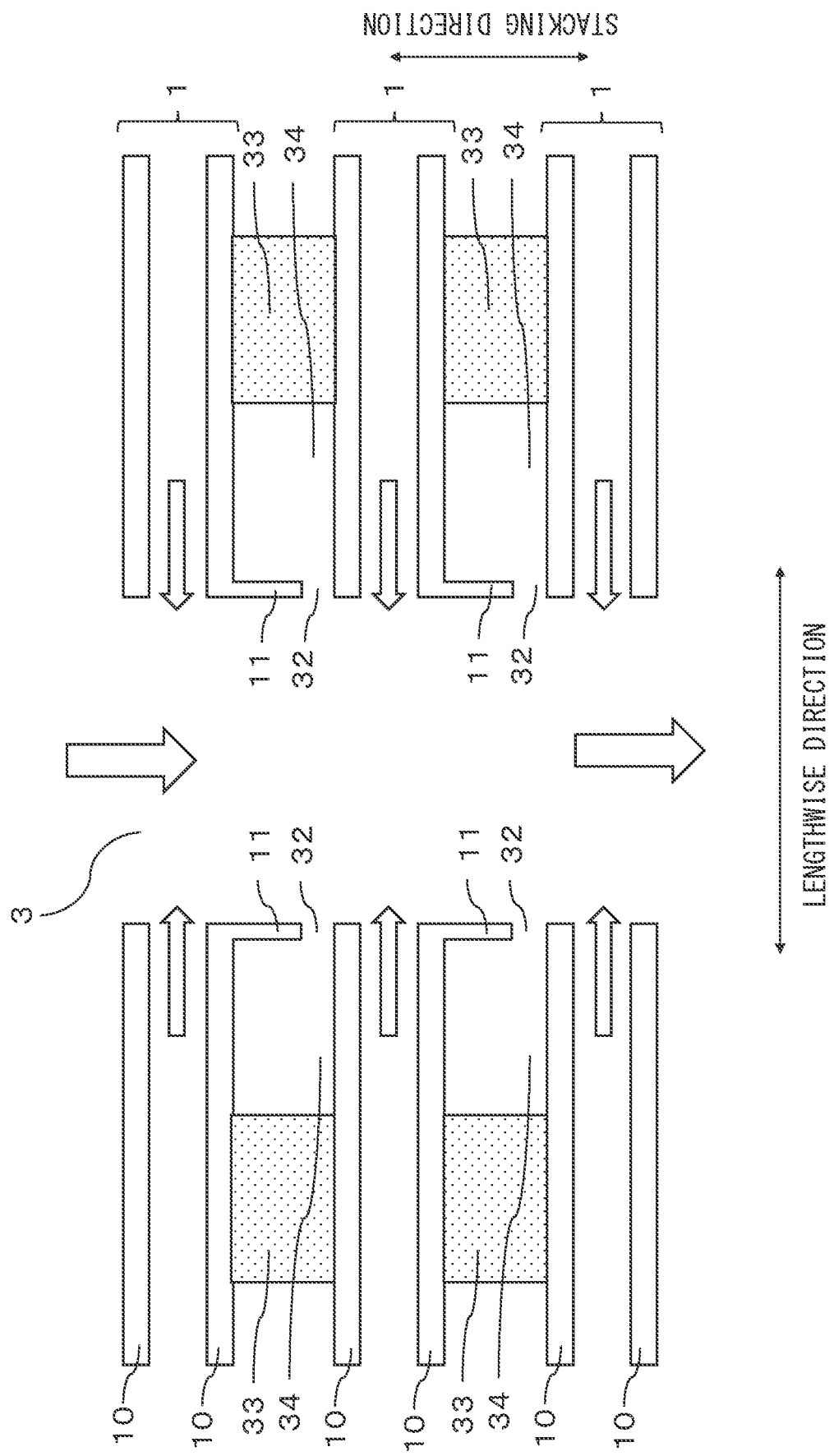
FIG. 8 is a cross-sectional view of the fuel cell stack 100 according to the second embodiment of the disclosure, along a cross-section corresponding to cross-section A-A' in FIG. 3.

One mode in which the wall members are formed by at least one of the separators is the mode illustrated in FIG. 8 as an example.

In FIG. 8, the wall members 11 are formed by separators 10.

In FIG. 8, the outlined arrows indicate the direction in which the reactive gas flows during electric power generation. FIG. 8 is not intended to limit the fuel cell stack, fuel cell system or controlling method of the disclosure.

<Gaskets>

The gaskets are disposed between the separators of every two adjacent fuel cell unit cells. The gaskets join together the separators of every two adjacent fuel cell unit cells, and are disposed so as to at least partially have gaps with the wall members, on opposite sides of the wall members from the reactive gas discharge flow holes, as viewed in the stacking direction.

The material of the gaskets may be a material commonly used in fuel cell gaskets, and it may be a resin material, for example. The resin material may be rubber, for example.

<Water Storage Units>

The water storage units are surrounded by the separators of every two adjacent fuel cell unit cells, the wall members and the gaskets, and communicate with the reactive gas discharge manifold via the gaps of the wall members.

For the liquid water retained in the reactive gas discharge manifold to be efficiently stored in the water storage units, it is preferred for the water storage units and gaps to be formed surrounding the reactive gas discharge manifold, as viewed from the stacking direction.

The volume of the water storage units is not particularly restricted, and it may be decided from the viewpoint of providing a sufficient volume to allow adequate uptake of water accumulated in the reactive gas discharge manifold, from among the liquid water formed during electric power generation in the fuel cell stack, or liquid water used for humidification of the reactive gases, i.e. the anode gas and/or cathode gas, which is present when water storage units are not provided.

<Fuel Cell System>

The fuel cell system of the disclosure is a fuel cell system comprising a fuel cell stack of the disclosure, reactive gas supply channel, reactive gas discharge channel and controller. The fuel cell system of the disclosure is configured so that reactive gas circulates through the reactive gas supply channel, fuel cell stack and reactive gas discharge channel, in that order. The reactive gas supply channel has a valve and/or a compressor. The reactive gas discharge channel has a valve.

The controller controls at least the valve and compressor of the reactive gas supply channel or the valve of the reactive gas discharge channel, to reduce the pressure in the reactive gas discharge manifold, whereby liquid water formed by the cell reaction, which is retained in the water storage units, is discharged into the reactive gas discharge manifold and the interior of the reactive gas discharge manifold is scavenged, allowing liquid water discharged in the reactive gas discharge manifold to be discharged out of the fuel cell stack.

As mentioned above, this allows the fuel cell stack of the disclosure to decrease and increase pressure inside the reactive gas discharge manifold to control the amount of liquid water retained in the water storage units. In the fuel cell system of the disclosure, increase and decrease of pressure inside the reactive gas discharge manifold is carried out by the valves or compressor disposed in the reactive gas supply channel and reactive gas discharge channel, to allow easy control of the amount of liquid water retained in the water storage units.

In the fuel cell system of the disclosure, when liquid water generated by the cell reaction which is retained in the water storage unit is discharged into the reactive gas discharge manifold, and the liquid water discharged into the reactive gas discharge manifold is discharged out of the fuel cell stack, some liquid water often remains in the reactive gas discharge manifold and not being discharged out of the fuel cell stack.

In such cases, the controller may also control at least one from among the valve and compressor of the reactive gas supply channel and the valve of the reactive gas discharge channel, to increase the pressure in the reactive gas discharge manifold, allowing liquid water that was not discharged out of the fuel cell stack to flow into and be retained in the water storage unit.

Figure 9:
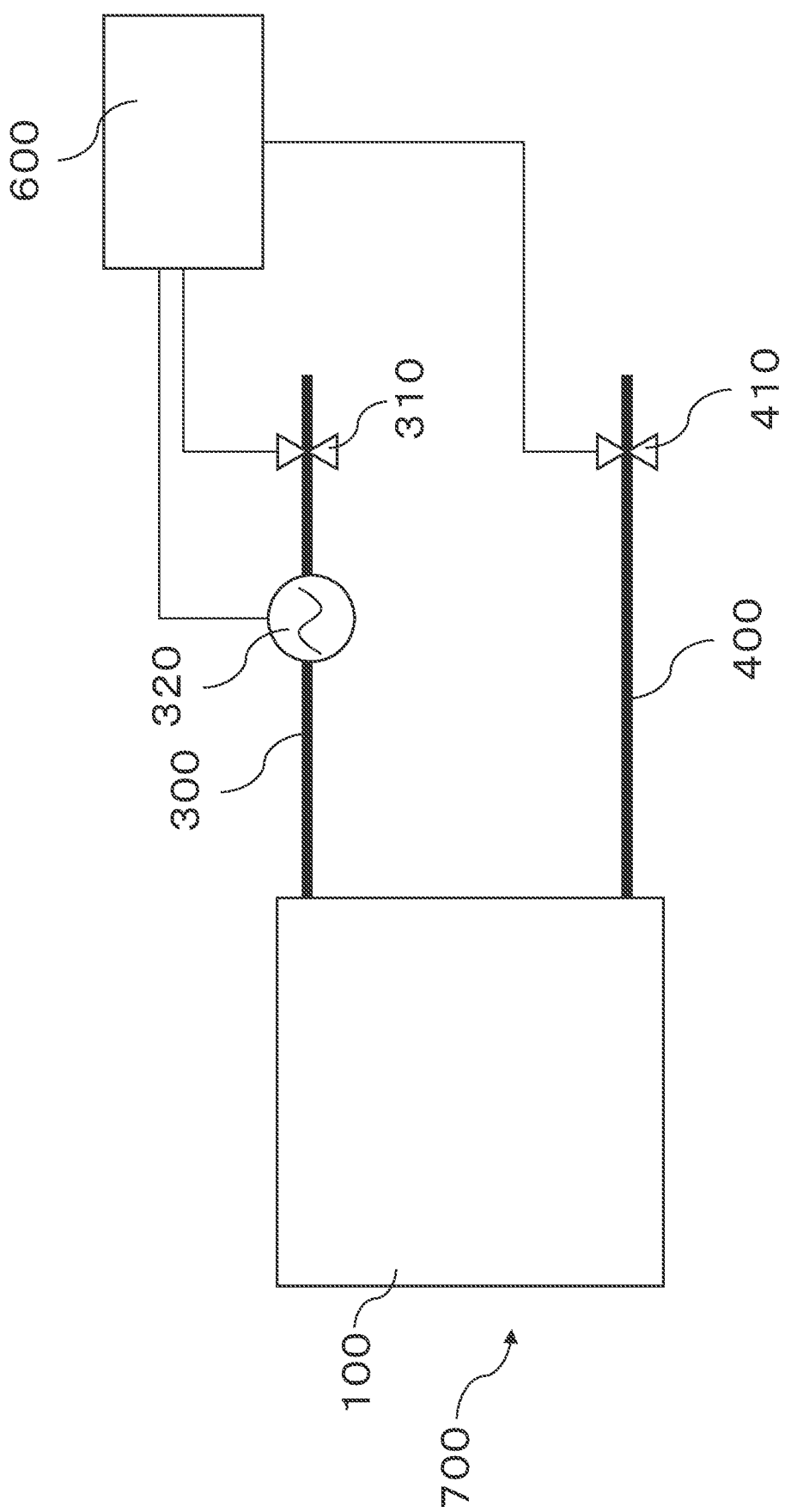
FIG. 9 is a schematic diagram of a fuel cell system 700 according to a first embodiment of the disclosure.
Figure 10:
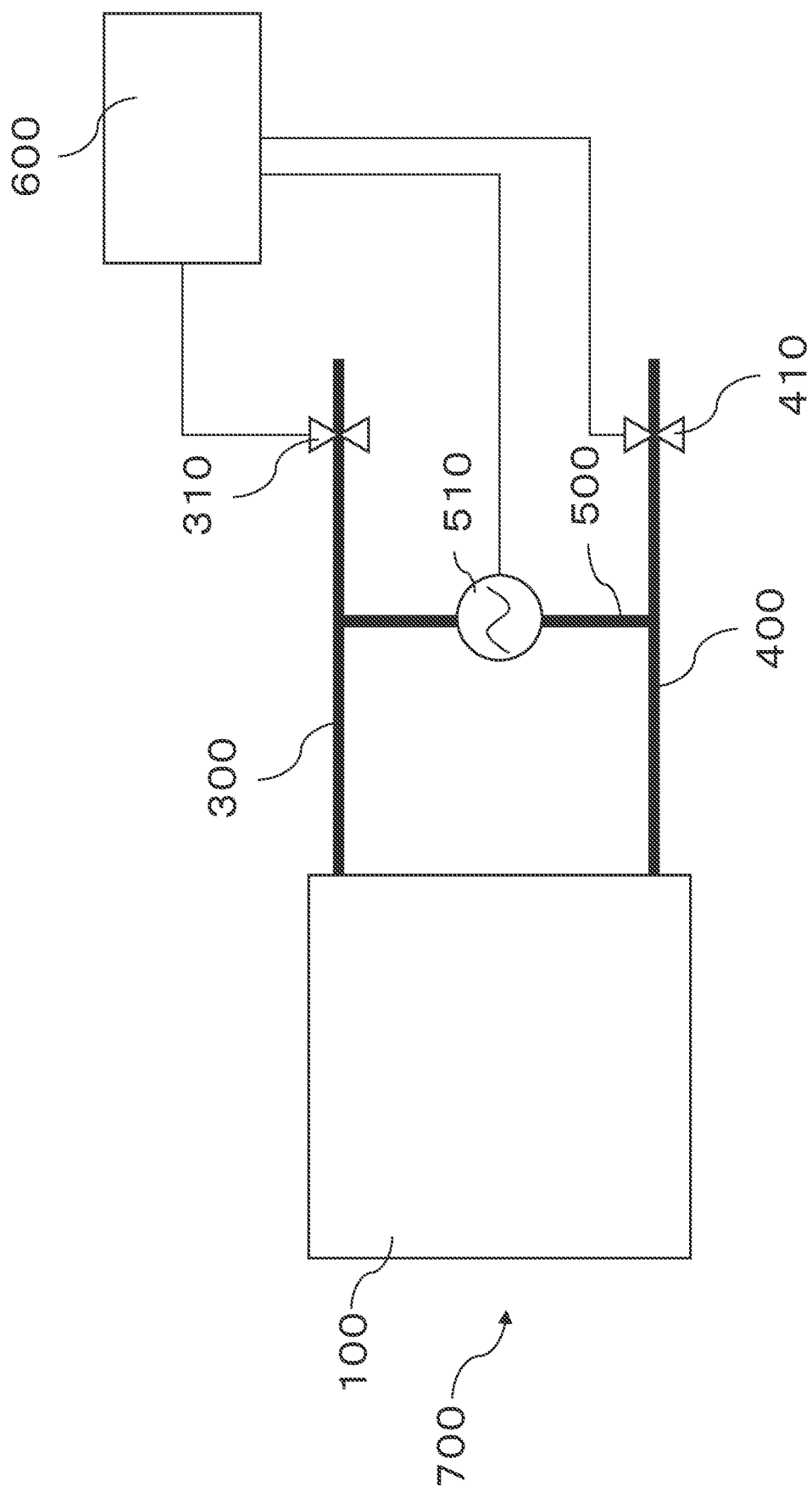
FIG. 10 is a schematic diagram of a fuel cell system 700 according to a second embodiment of the disclosure.

The fuel cell system of the disclosure may have a configuration as shown in FIG. 9 and FIG. 10, for example.

FIG. 9 is a schematic diagram of a fuel cell system 700 according to a first embodiment of the disclosure.

As shown in FIG. 9, the fuel cell system 700 of the first embodiment of the disclosure comprises a fuel cell stack 100, a reactive gas supply channel 300, a reactive gas discharge channel 400 and a controller 600. In the fuel cell system 700 of the first embodiment of the disclosure, the configuration is such that reactive gas circulates through the reactive gas supply channel 300, fuel cell stack 100 and reactive gas discharge channel 400, in that order. The reactive gas supply channel 300 has a valve 310 and a compressor 320. The reactive gas discharge channel 400 also has a valve 410.

In the fuel cell system 700 of the first embodiment of the disclosure, the controller 600 controls at least the valve 310 and compressor 320 of the reactive gas supply channel 300 or the valve 410 of the reactive gas discharge channel 400, to reduce the pressure in the reactive gas discharge manifold 3, whereby liquid water 200 formed by the cell reaction, which is retained in the water storage units 34, is discharged into the reactive gas discharge manifold 3, and the interior of the reactive gas discharge manifold 3 is scavenged, allowing liquid water 200 discharged into the reactive gas discharge manifold 3 to be discharged out of the fuel cell stack 100.

In addition, the fuel cell system 700 of the first embodiment of the disclosure may control at least one from among the valve 310 and compressor 320 of the reactive gas supply channel 300 and the valve 410 of the reactive gas discharge channel 400 using the controller 600, to increase the pressure in the reactive gas discharge manifold 3, allowing liquid water 200 that was not discharged out of the fuel cell stack 100 to flow into and be retained in the water storage unit 34.

More specifically, the controller 600 in the fuel cell system 700 of the first embodiment of the disclosure may control the valve 310 and/or the compressor 320 of the reactive gas supply channel 300 to reduce the flow rate of reactive gas supplied from the reactive gas supply channel 300 to the fuel cell stack 100, and/or it may control the valve 410 of the reactive gas discharge channel 400 to increase the flow rate of the reactive gas discharged from the fuel cell stack 100 into the reactive gas discharge channel 400, to decrease the air pressure inside the reactive gas discharge manifold 3. For example, the controller 600 may control the valve 310 and/or compressor 320 of the reactive gas supply channel 300 to increase the flow rate of the reactive gas in the reactive gas discharge manifold 3, to scavenge the interior of the reactive gas discharge manifold 3.

Alternatively, the controller 600 in the fuel cell system 700 of the first embodiment of the disclosure may control the valve 310 and/or the compressor 320 of the reactive gas supply channel 300 to increase the flow rate of reactive gas supplied from the reactive gas supply channel 300 to the fuel cell stack 100, and/or it may control the valve 410 of the reactive gas discharge channel 400 to decrease the flow rate of the reactive gas discharged from the fuel cell stack 100 into the reactive gas discharge channel 400, to increase the air pressure inside the reactive gas discharge manifold 3.

FIG. 10 is a schematic diagram of a fuel cell system 700 according to a second embodiment of the disclosure.

As shown in FIG. 10, the fuel cell system 700 of the second embodiment of the disclosure comprises a fuel cell stack 100, a reactive gas supply channel 300, a reactive gas discharge channel 400 and a controller 600. In the fuel cell system 700 of the second embodiment of the disclosure, the reactive gas supply channel 300 and the reactive gas discharge channel 400 are in communication via a fluid channel 500. The fluid channel 500 has a compressor 510.

The fluid channel 500 may be considered to be part of the reactive gas supply channel 300, and in the fuel cell system 700 of the second embodiment of the disclosure, the controller 600 controls at least the valve 310 of the reactive gas supply channel 300 and the compressor 510 of the fluid channel 500, and/or the valve 410 of the reactive gas discharge channel 400, to reduce the pressure in the reactive gas discharge manifold 3, whereby liquid water 200 formed by the cell reaction, which is retained in the water storage units 34, is discharged into the reactive gas discharge manifold 3, allowing the liquid water 200 discharged into the reactive gas discharge manifold 3 to be discharged out of the fuel cell stack 100.

FIGS. 9 and 10 are not intended to limit the fuel cell stack, fuel cell system or controlling method of the disclosure.

<Fuel Cell Stack>

The fuel cell stack of the fuel cell system of the disclosure is as described above for the fuel cell stack of the disclosure.

<Reactive Gas Supply Channel>

The reactive gas supply channel of the fuel cell system of the disclosure is a fluid channel for supply of reactive gas to the fuel cell stack. The reactive gas supply channel has a valve and/or a compressor.

When the reactive gas is an anode gas such as hydrogen gas, the reactive gas supply channel allows communication between the reactive gas source, such as an anode gas tank, and the reactive gas supply channel of the fuel cell stack. When the reactive gas is a cathode gas such as oxygen or air, the reactive gas supply channel allows communication between the exterior of the fuel cell system and the reactive gas supply channel of the fuel cell stack.

<Reactive Gas Discharge Channel>

The reactive gas discharge channel of the fuel cell system of the disclosure is a fluid channel for discharge of reactive gas from the fuel cell stack. The reactive gas discharge channel has a valve. The reactive gas discharge channel allows communication between the reactive gas discharge manifold of the fuel cell stack and the exterior of the fuel cell system. Particularly when the reactive gas is an anode gas such as hydrogen gas, the reactive gas discharge channel may branch out into a fluid channel connected with the exterior of the fuel cell system and a fluid channel connected with the reactive gas supply channel. In this case, the valve is disposed in the fluid channel connected with the exterior of the fuel cell system, while the compressor is disposed in the fluid channel connected with the reactive gas supply channel. The fluid channel connected with the reactive gas supply channel can be considered to be part of the reactive gas supply channel.

<Controller>

The controller of the fuel cell system of the disclosure controls at least the valve and compressor of the reactive gas supply channel and/or the valve of the reactive gas discharge channel, to reduce the pressure in the reactive gas discharge manifold, whereby liquid water formed by the cell reaction, which is retained in the water storage units, is discharged into the reactive gas discharge manifold, allowing the liquid water discharged into the reactive gas discharge manifold to be discharged out of the fuel cell stack.

In such cases, the controller may control at least one from among the valve and compressor of the reactive gas supply channel and the valve of the reactive gas discharge channel, to increase the pressure in the reactive gas discharge manifold, allowing liquid water that was not discharged out of the fuel cell stack to flow into and be retained in the water storage unit.

Control of the valve and compressor of the reactive gas supply channel and the valve of the reactive gas discharge channel by the controller may be carried out when it is necessary to discharge liquid water from the water storage units.

The situation in which it is necessary to discharge liquid water from the water storage units is not particularly restricted, and it may be one in which it is expected that the fuel cell stack or the reactive gas discharge channel downstream from it will fall below the freezing point during operation of the fuel cell system, for example.

The method of control in such cases is not particularly restricted, and for example, it may be a method in which, when the outdoor air temperature has reached a prescribed temperature, a signal is sent to the controller by a temperature sensor and the controller begins control upon receipt of the signal.

<Controlling Method>

The controlling method according to the disclosure is a method for controlling the fuel cell stack of the disclosure.

The controlling method of the disclosure includes reducing the pressure in the reactive gas discharge manifold, so that liquid water produced by electric power generation in the fuel cell stack, which has been retained in the water storage unit, is discharged into the reactive gas discharge manifold, and the interior of the reactive gas discharge manifold is scavenged, whereby the liquid water that was discharged into the reactive gas discharge manifold is discharged out of the fuel cell stack.

The controlling method of the disclosure may further include increasing the pressure in the reactive gas discharge manifold to cause liquid water that was not discharged out of the fuel cell stack by the scavenging, to flow into and be retained in the water storage units.

The controlling method of the disclosure may be carried out using the fuel cell system of the disclosure, for example.

The controlling method of the disclosure may also be carried out when it has been judged that drainage of the interior of the reactive gas discharge manifold is necessary. Judgment of whether or not drainage of the reactive gas discharge manifold is necessary may be judgment of whether or not the fuel cell stack or the reactive gas discharge channel downstream from it is expected to fall below the freezing point during operation of the fuel cell system, for example.

FIG. 11 is a flow chart illustrating a method of controlling the controlling method according to the first embodiment of the disclosure.

As shown in FIG. 11, the controlling method of the first embodiment of the disclosure is carried out when drainage of the reactive gas discharge manifold is necessary (S1). When it is judged that drainage of the reactive gas discharge manifold is not necessary, the controlling method of the first embodiment of the disclosure is not carried out.

When it is judged that drainage of the reactive gas discharge manifold is necessary, the interior of the reactive gas discharge manifold is reduced in pressure to a predetermined pressure $P_1$ (S2), thus causing the liquid water generated by electric power generation in the fuel cell stack, which has been retained in the water storage units, to be discharged into the reactive gas discharge manifold.

The reactive gas discharge manifold interior is then scavenged (S3).

It is then judged whether or not a predetermined time has elapsed (S4), and when the predetermined time has elapsed, the reactive gas discharge manifold interior is increased in pressure to $P_2$ (S5), the scavenging causing the liquid water that was not discharged out of the fuel cell stack to flow into and be retained in the water storage unit.

FIG. 11 is not intended to limit the fuel cell stack, fuel cell system or controlling method of the disclosure.

Pressure reduction and increase in the reactive gas discharge manifold can be carried out by control as described for the fuel cell system of the present disclosure. It can be judged whether or not the reactive gas discharge manifold interior is at the predetermined air pressure by using an air pressure sensor situated in the reactive gas supply channel or in the reactive gas discharge channel, for example.

REFERENCE SIGNS LIST

1 Fuel cell unit cell
3 Reactive gas discharge manifold
10 Separator
30 Reactive gas discharge flow hole
31 Wall member
33 Gasket
34 Water storage unit
100 Fuel cell stack
300 Reactive gas supply channel
310 Valve
320 Compressor
400 Reactive gas discharge channel
410 Valve
600 Controller
700 Fuel cell system

The invention claimed is:

1. A fuel cell stack comprising two or more fuel cell unit cells stacked together, in which:
    each fuel cell unit cell has a power generating element and a pair of separators stacked on either side of the power generating element,
    the pair of separators have reactive gas discharge flow holes running through the pair of separators in the stacking direction of the fuel cell unit cells, and
    every two adjacent fuel cell unit cells are stacked together with their separators mutually adjacent and with the reactive gas discharge flow holes of the separators connected to form a reactive gas discharge manifold,
    wherein:
    the fuel cell stack has wall members and gaskets between the separators of the two mutually adjacent fuel cell unit cells,
    the wall members are disposed so as to have gaps in at least portions of the regions between the separators of the two mutually adjacent fuel cell unit cells and so as to enclose the reactive gas discharge flow holes as viewed in the stacking direction, and
    the gaskets join together the separators of the two mutually adjacent fuel cell unit cells and are disposed so as to at least partially have gaps with the wall members on the opposite sides of the wall members from the reactive gas discharge flow holes, as viewed in the stacking direction,
    whereby water storage units are formed that are surrounded by the separators of the two mutually adjacent fuel cell unit cells, the wall members and the gaskets, and that communicate with the reactive gas discharge manifold via the gaps of the wall members.

2. The fuel cell stack according to claim 1, wherein each wall member is formed by at least one of the separators of the two mutually adjacent fuel cell unit cells.

3. The fuel cell stack according to claim 1, wherein the power generating element has a cathode gas diffusion layer, a cathode catalyst electrode layer, an electrolyte layer, an anode catalyst electrode layer and an anode gas diffusion layer in that order.

4. A fuel cell system comprising a fuel cell stack according to claim 1, a reactive gas supply channel, a reactive gas discharge channel and a controller, wherein:

reactive gas is circulated through the reactive gas supply channel, the fuel cell stack and the reactive gas discharge channel in that order, the reactive gas supply channel has a valve and/or a compressor, the reactive gas discharge channel has a valve, and the controller:

controls at least one from among the valve and compressor of the reactive gas supply channel and the valve of the reactive gas discharge channel, to reduce the pressure in the reactive gas discharge manifold, thereby discharging liquid water formed by the cell reaction, which has been retained in the water storage unit, into the reactive gas discharge manifold, and to scavenge the interior of the reactive gas discharge manifold, allowing the liquid water that has been discharged into the reactive gas discharge manifold to be discharged out of the fuel cell stack.

5. The fuel cell system according to claim 4, wherein:

at least one from among the valve and compressor of the reactive gas supply channel and the valve of the reactive gas discharge channel is controlled to increase the pressure in the reactive gas discharge manifold, allowing liquid water that was not discharged out of the fuel cell stack to flow into and be retained in the water storage unit.

6. A method for controlling a fuel cell stack according to claim 1, wherein the method includes:

reducing the pressure in the reactive gas discharge manifold to discharge liquid water produced by electric power generation in the fuel cell stack, which has been retained in the water storage unit, into the reactive gas discharge manifold, and scavenging the interior of the reactive gas discharge manifold, so that liquid water that was discharged into the reactive gas discharge manifold is discharged out of the fuel cell stack.

7. The method according to claim 6, which further includes increasing the pressure in the reactive gas discharge manifold to cause liquid water that was not discharged out of the fuel cell stack by the scavenging, to flow into and be retained in the water storage unit.

* * * * *